US007194553B2

(12) United States Patent
Lucco et al.

(10) Patent No.: US 7,194,553 B2
(45) Date of Patent: Mar. 20, 2007

(54) RESOLVING VIRTUAL NETWORK NAMES

(75) Inventors: Steven E. Lucco, Bellevue, WA (US);
Erik B. Christensen, Seattle, WA (US);
Andrew J. Layman, Bellevue, WA (US); David E. Levin, Redmond, WA (US); Bradford H. Lovering, Seattle, WA (US); Henrik Frystyk Nielsen, Seattle, WA (US); John P. Shewchuk, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 815 days.

(21) Appl. No.: 09/983,539

(22) Filed: Oct. 24, 2001

(65) Prior Publication Data

US 2003/0074472 A1  Apr. 17, 2003

Related U.S. Application Data

(60) Provisional application No. 60/346,370, filed on Oct. 19, 2001, provisional application No. 60/329,796, filed on Oct. 16, 2001.

(51) Int. Cl.
G06F 15/16 (2006.01)
G00F 15/173 (2006.01)

(52) U.S. Cl. ..................... 709/245; 709/238
(58) Field of Classification Search ........ 709/223–226, 709/229, 203, 245; 370/389–390
See application file for complete search history.

(56) References Cited

U.S. PATENT DOCUMENTS 5,761,477 A     6/1998  Wahbe et al.
5,978,836 A *  11/1999  Ouchi .................... 709/206
6,006,259 A    12/1999  Adelman et al.
6,026,441 A     2/2000  Ronen
6,119,171 A     9/2000  Alkhatib
6,151,618 A    11/2000  Wahbe et al.
6,199,112 B1 *  3/2001  Wilson ................... 709/227
6,243,749 B1    6/2001  Sitaraman et al.
6,304,913 B1 * 10/2001  Rune .......................... 709/241
6,505,254 B1 *  1/2003  Johnson et al. .......... 709/239
6,578,066 B1 *  6/2003  Logan et al. ............. 718/105
6,675,261 B2 *  1/2004  Shandony ................. 711/121
6,728,767 B1 *  4/2004  Day et al. ................. 709/223
6,763,040 B1 *  7/2004  Hite et al. ................ 370/522
6,789,118 B1 *  9/2004  Rao ........................ 709/225
2002/0078233 A1 *  6/2002  Biliris et al. ............. 709/238
2002/0143984 A1 * 10/2002  Hudson Michel ........ 709/238

OTHER PUBLICATIONS

"TIBCO Rendezvous—a TIBCO Active Enterprise Product", http://www.tibco.com/products/rv/index.html printed Dec. 10, 2001, 2 Pages.

(Continued)

*Primary Examiner*—Jason Cardone
*Assistant Examiner*—Minh-Chau N. Nguyen
(74) *Attorney, Agent, or Firm*—Banner & Witcoff, Ltd.

(57) ABSTRACT

An apparatus and method is provided for resolving virtual network names using one or more name routers. A conventional Uniform Resource Locator (URL) naming scheme is extended by allowing any component to be mapped to an address. The resolution process occurs recursively through a plurality of name routers. Resolution can be contextual, such that the same virtual network name may be resolved differently depending on the identity of the client or other parameters.

26 Claims, 7 Drawing Sheets

OTHER PUBLICATIONS

"TIBCO Rendezvous TX—a TIBCO Active Enterprise Product", http:///www.tibco.com/products/rv/rvtx.html printed Dec. 10, 2001, 2 Pages.

"TIBCO Enterprise for JMS", http:///www.tibco.com/products/enterprise_for_jms.html printed Dec. 10, 2001, 1 Page.

Henrik F. Nielsen et al., "SOAP Routing Protocol" http://www.gotdotnet.com/team/xml_wsspecs/soap-rp/default.html, May 23, 2001, 36 Pages.

G. Robert Malan et al., "An Extensible Probe Architecture for Network Protocol Performance Measurement", Department of Electrical Engineering And Computer Science, University of Michigan, SIGCOMM 1998, Vancouver, pp. 215-227.

Kunihiko Toumura et al., "Implementing Multiple Name Spaces Using An Active Network Technology", Jun. 2000, pp. 1665-1676.

David Potter et al., "Connecting minis to local nets with discrete modules", Data Communications, Jun. 1983, pp. 161-164.

Steven M. Dean et al., "CONE: A Software Environment for Network Protocols", Hewlett-Packard Journal, Feb. 1990, pp. 18-28.

Fumiko Kouda et al., "Representation Of Descriptive Name and the Resolution Method with a Semantic Network Structure", Journal of Information Processing, vol. 15, No. 2, 1992, pp. 280-292.

Henrik F. Nielsen et al., "Direct Internet Message Encapsulation", May 23, 2001, 13 Pages.

B. Ramsey, "An RTOS with its Nest is pure dynamite", Electronic Engineering Times, Sep. 11, 1995, No. 865, p. 76, 3 pages.

Richard Bowers, "Apple's Free Internet Domain Name Server Software", Post-Newsweek Business Information, Inc., May 2, 1996, 1 page.

Mourad A et al; "Scalable Web Server Architecture"; Proceeding IEEE International Symposium on Computer and Communications; Jul. 1, 1999; pp. 12-16; XP000199852.

* cited by examiner

RESOLVING VIRTUAL NETWORK NAMES

This application claims priority to U.S. provisional application Ser. No. 60/329,796 filed Oct. 16, 2001, and U.S. provisional application Ser. No. 60/346,370 filed on Oct. 19, 2001, each of which is herein incorporated by reference.

FIELD OF THE INVENTION

The invention relates generally to computer networks. More particularly, the invention allows messages to be routed to one or more virtual communication endpoints using a name resolution process.

BACKGROUND OF THE INVENTION

For many years the Internet has provided a vast network of linked computers that route messages using the well-known Internet Protocol (IP). Special devices known as "routers" determine where each data packet should be sent, such that a given data packet or "datagram" arrives at its intended destination even though the specific path may not be known to the originator of the message. Each computer or router is assigned one or more IP addresses, which are at present a 32-bit number represented m so-called "dot" notation such as 12.152.34.61. Each packet generally includes a source IP address, a destination IP address, and other fields in a header that collectively determine where and how the packet is routed among the network. Routers in the network maintain knowledge regarding other routers to which they are connected, such that packets are eventually routed to a final endpoint represented by the destination IP address.

Web pages and other resources can be stored on computers that have one or more assigned IP addresses. However, because IP addresses are difficult for humans to remember, a text-based hierarchical name known as a Uniform Resource Locator (URL) is frequently used to uniquely identify a Web page or other resource (e.g., www.foo.com). When a computer user enters such a URL into a Web browser, the browser transmits the URL to a Domain Name Server (DNS), which translates the URL into an IP address representing a computer on which the Web page can be found. The Web browser then sends a retrieval command to that computer. This process is known as DNS name resolution.

Referring to FIG. 1, suppose that a Web browser 104 operating on a client computer 101 allows a user to enter an arbitrary URL, such as http://foo.microsoft.com/foo/bar/bing.htm. The first component ("http:") is a scheme identifier that specifies which Internet protocol is to be used to communicate with the machine holding the document or providing the service. The second component, "//foo.microsoft.com" is called a "host name" and is used to identify a particular computer or set of computers connected to the Internet. The third component, "/foo/bar/bing.htm" is a machine-local identifier for finding the desired document or service on the machine.

As illustrated in FIG. 1, the conventional Internet resolution process for the above URL is as follows.

First, Web browser 104 issues a DNS request 107 to the Internet's Domain Name Service, represented by DNS server 102. DNS server 102 includes a table 105 that maps each URL to a corresponding IP address. In response to request 107, DNS server 102 resolves "foo.microsoft.com" into an IP address, e.g., 1.2.3.4 at step 108, which is then returned to client computer 101. Although several different servers may be contacted during the resolution of this portion of the URL, only the complete resolution, from "foo.microsoft.com" to 1.2.3.4 can be cached. In order to resolve a related name, such as "foo2.microsoft.com," the resolution process must be started from scratch.

Second, Web browser 104 contacts Web server 103 (e.g., the machine bound to IP address 1.2.3.4) using HTTP (HyperText Transport Protocol), and requests resource http://foo.microsoft.com/foo/bar/bing.htm as indicated by request 109 in FIG. 1. Handing in the full URL is necessary, as a given machine may be pointed to by several different host names, e.g. http://microsoft.com and http://foo.microsoft.com may both resolve to 1.2.3.4. Machine 103 then responds in step 110 with the resource 106, which is displayed as a Web page on browser 104.

This resolution mechanism presents various administrative problems, since different machines providing different services must provide different host names. For example, suppose that www.foo.com is used to host a World Wide Web service, while mail.foo.com is used to host a mail service. Management burdens include the necessity of creating and maintaining all these names, and the inability of conventional systems to allow the application of resolution policy across machines that share domain components. Moreover, the DNS resolution scheme is inflexible, in that if a host computer is moved, a file must be changed on the DNS server to reflect the new physical location of the computer.

What is needed is a system and method that allows services and resources to be named and addressed with much greater control and flexibility, and that provides mechanisms to increase the efficiency of the resolution process.

SUMMARY OF THE INVENTION

The invention allows messages to be routed to virtual network endpoints using a name resolution process. A message service, which may be implemented in conjunction with a name resolution proxy, routes a message to a name router using a virtual network name. The name router resolves part of the virtual network name and forwards the message to a destination corresponding to the resolved part of the virtual network name. The destination, if it is another name router, resolves a next part of the virtual network name, and the process continues until the destination endpoint is reached. Embodiments of the invention include one or more of the following features:

(1) The ability to send a message to a given virtual network name (VNN) through a series of name routers;

(2) a recursive lookup algorithm that supports caching of intermediate results in the resolution of a VNN;

(3) the caching of the intermediate and final results of such resolution;

(4) the ability to route a given message to multiple endpoints, or to one of a set of potential endpoints (that is, the ability to identify a set of endpoints with a single VNN and state whether a given message should be sent to one, some, or all of the endpoints);

(5) the ability to specify and apply policies to the resolution of a given VNN;

(6) the ability to specify and apply policies to the visibility of a given VNN;

(7) the ability to generate and disseminate notifications about namespace administrative actions;

(8) the ability to generate and assign temporary VNNs;

(9) the ability to generate a VNN based on a key; and

(10) the ability to provide a mechanism for default routing of a message.

Other advantages and features will become apparent with reference to following description, figures, and claims.

DETAILED DESCRIPTION OF THE INVENTION

Figure 1:
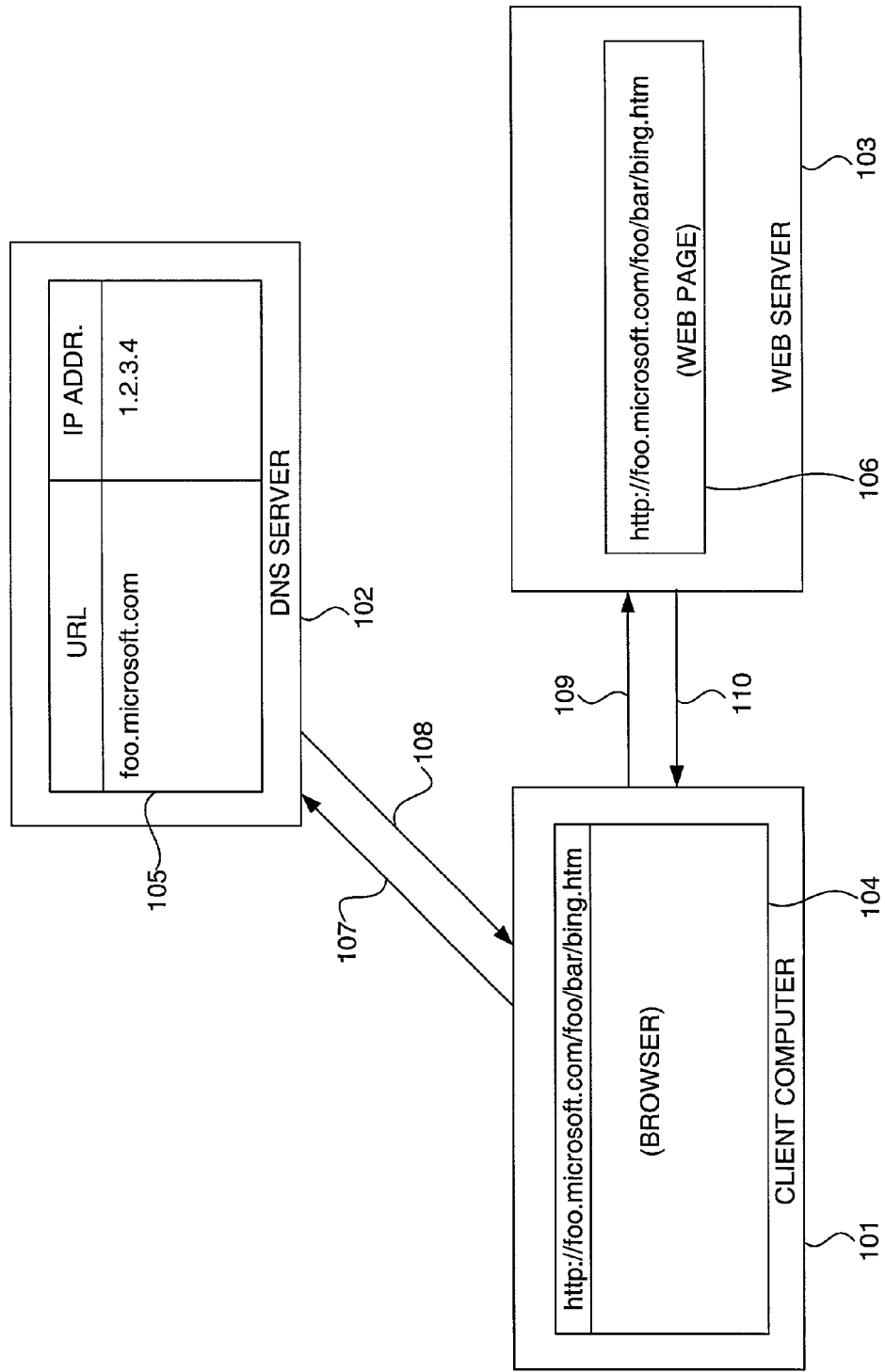
FIG. 1 shows a conventional DNS name resolution scheme.

One embodiment of the invention extends the conventional URL naming scheme by allowing any component of the URL to be mapped to a physical machine address. This means, for example, that one might expose a World Wide Web service as http://www.foo.com/web and a mail service as http://www.foo.com/mail, and have each of these URLs map to different machines, because the "web" and "mail" components now can become resolved independently, instead of both of them necessarily pointing to the same physical machine as in conventional DNS name resolution practice.

In addition, the resolution can be contextual; that is, the resolution process can consider the identity of the client resolving the address, or it can consider the network location of the client and resolve to the service nearest the client, or apply some other policy based on additional information.

Another aspect of the invention further enhances conventional Internet naming by allowing a client to send a message to a particular VNN through a construct referred to as a "name router." This allows clients to offload VNN resolution and message handling. The term "virtual network name" or VNN will be used to refer to a name that identifies a communication endpoint in a network, wherein the name may not have a static association with a physical machine address (i.e., the physical machine address may change or differ even when the same VNN is used).

Certain embodiments of the system include one or more name resolution/routing servers, described in more detail below. Virtual name routers may include a name resolution function (i.e., conversion of a name or portions of a name into an address), a routing function (e.g., the ability to forward a message to an address), and other functions as described below. It should be appreciated that these functions can be split among different computers, such that a name server function resides on one machine, whereas the routing function resides on a different machine. (For example, the name resolution function could reside on one machine, while the routing function resides on the client machine). Other implementations are of course possible, with the location and structure of a particular function being dictated by design concerns. The term "virtual name server" should be understood to include at least a name resolution function; and the term "virtual name router" should be understood to include at least a message routing function; and the term "virtual name resolution/router" should be understood to include both functions. Elsewhere herein, the particular functions to be ascribed to an element will be apparent from the context in which the element is used.

Implied by the use of this system are components such as a client that is requesting the message delivery and the existing Domain Name Service (DNS), although the inventive principles can be applied without requiring DNS. The generic term "name server" should be understood to refer to any server that performs a resolution function, including but not limited to the conventional Domain Name Service (DNS).

Aspects of the invention can be grouped into four categories, each of which is discussed separately below:

1. Message routing and routing acceleration
2. Applications of policy to message routing and acceleration
3. Notifications on namespace administration actions
4. Automatic name generation and delegation Message Routing and Routing Acceleration A first feature of the present invention includes the ability to send a message to a given communication endpoint identified by a VNN, such as a URL, through a series of name routers. As a subset of this feature, a VNN can be assigned to a communications endpoint no matter what network protocol is used to communicate with that endpoint.

A second feature includes the ability to resolve URL components beyond the domain name to specific name routers.

A third feature includes the ability to return intermediate results to be cached, thus accelerating the name resolution and routing process.

A fourth feature provides the ability to route a given message to multiple endpoints, or to one of a set of potential endpoints (that is, the ability to identify a set of endpoints with a single VNN and state whether a given message should be sent to one, some, or all of the endpoints).

Figure 2:
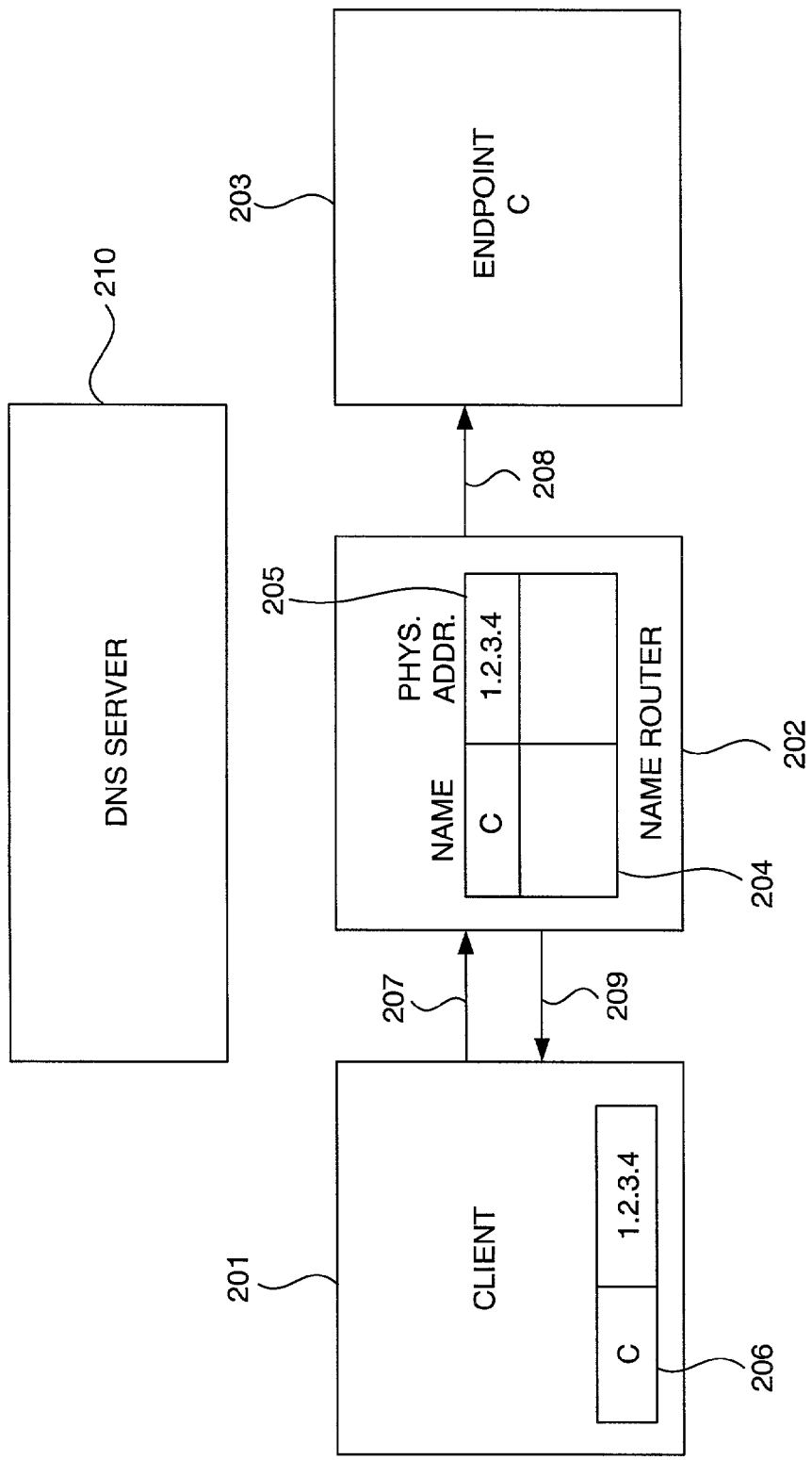
FIG. 2 shows a system according to various aspects of the present invention.

FIG. 2 shows a system employing various principles of the invention according to a first embodiment. Name resolution and routing allows a client to send a message to one or more communications endpoints through a series of name routers. As shown in FIG. 2, a client 201 sends a message intended to be delivered to a communications endpoint 203 through one or more name routers 202. Any number of name routers may be used to route the message to its final destination, but for the purposes of this explanation, only one name router will be referenced. Each name router is to be distinguished from conventional DNS servers, such as DNS server 210. Such conventional servers merely resolve a fixed portion of a URL according to a nonextendable scheme as illustrated in FIG. 1.

Name router 202, which may comprise a software function residing on a computer, maintains a virtual name table 204 including an entry 205 that maps the virtual name for communications endpoint C to a specific physical address used to directly access endpoint C (e.g., it maps an arbitrary name to an IP address). Client 201 sends the message destined for endpoint 203 having name C to name router 202, which uses mapping entry 205 to forward the message to the physical address for endpoint C. It should be appreciated that although name router 202 is shown as a separate physical computer, the name router could be resident on the same computer as client 201.

In one variation, client 201 may also request acceleration information from name router 202. If client 201 has done so and client 201 has the appropriate permissions to acquire that information, name router 202 will return to client 201 a message 209 indicating that the virtual name for endpoint C maps to the particular physical address for endpoint C. Thus, after client 201 has received and cached this information as indicated at 206, it can then use the physical address for C to directly contact endpoint C, thus accelerating the process of delivering the message. As is conventional, cached entries can be automatically purged after a certain time period to remove stale entries.

In certain embodiments, communication endpoints can be specified using an extended URL syntax, wherein each of a plurality of name servers/routers is responsible for mapping a portion of the entire URL. In contrast to conventional DNS technology, where a DNS server always maps a fixed and known portion of a given URL to a single physical address, the URL is viewed as a set of discrete name components, each component of which is resolved by a separate name router in a system. A URL of the form http://aaa.com/bbb/ccc/ddd.htm might, for example, be resolved by several different name routers: the aaa component would be resolved by the conventional DNS server, which would resolve to a name router for the bbb component. The message would be sent to the name router for bbb, which would then resolve the next component ccc, and so forth, until the final endpoint was determined. Alternatively, communication endpoints can be identified by an arbitrary name (e.g., "Bob" or "Bob at Company X"), and a default name router can be used to resolve such arbitrary names.

Figure 3:
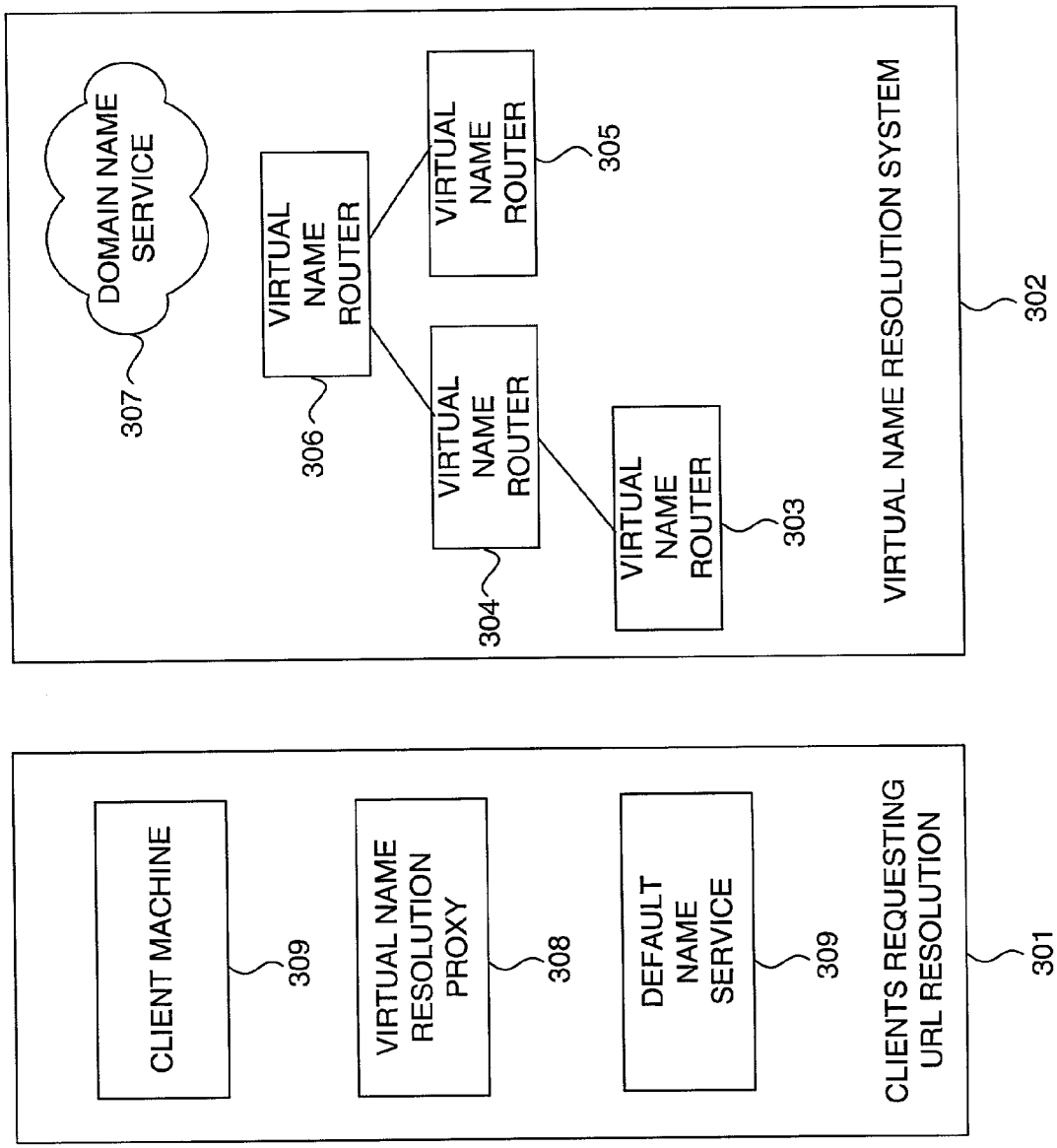
FIG. 3 shows a system including a client subsystem and a virtual name resolution subsystem according to one variation of the invention.

FIG. 3 shows a system for carrying out the above principles according to one embodiment of the invention. A first subsystem 301 includes one or more client machines 309 and one or more virtual name resolution proxy machines 308. It will be appreciated that one or all of the name resolution proxies may physically reside on one or more of the client machines. A virtual name resolution system 302 includes a conventional domain name service 307, which according to one embodiment serves to resolve the first level of each name. One or more virtual name routers 303 through 306 serve to resolve one or more portions of a virtual name, and are thus illustrated as being interconnected for such a purpose. The connections may comprise conventional network connections, such as local area networks, the Internet, etc. It should be understood that a given name may be resolved using a first set of name routers, while a second name may be resolved using a different set of name routers, and so forth.

Suppose that client 309 needs to send a message to a virtual name endpoint name (e.g., an extended URL as set forth above, or an arbitrary name, such as "Bob" or "Corporate Database.") Client 309 sends the message to the virtual name endpoint through virtual name resolution proxy machine 308. In one embodiment, proxy 308 sends a message to conventional domain name service 307 to obtain a physical machine address corresponding to a first level of name resolution. In another embodiment, such as where an arbitrary endpoint name is used that is not in the modified URL format, this step can be eliminated, and name resolution can proceed directly using for example a default name resolution service 309, which maps a physical machine that contains a first level of name mappings (e.g., one of the virtual name routers shown in subsystem 302).

Upon determining the virtual name router to which the first-level resolution should be sent, virtual name resolution proxy 308 transmits a message to the indicated virtual name router, requesting resolution of the name. The name router receives the request, resolves a portion of or all of the name using an internal mapping table, and returns the resolved name or portion of the name. The process continues recursively until the entire name is resolved and the final endpoint is determined.

Figure 4:
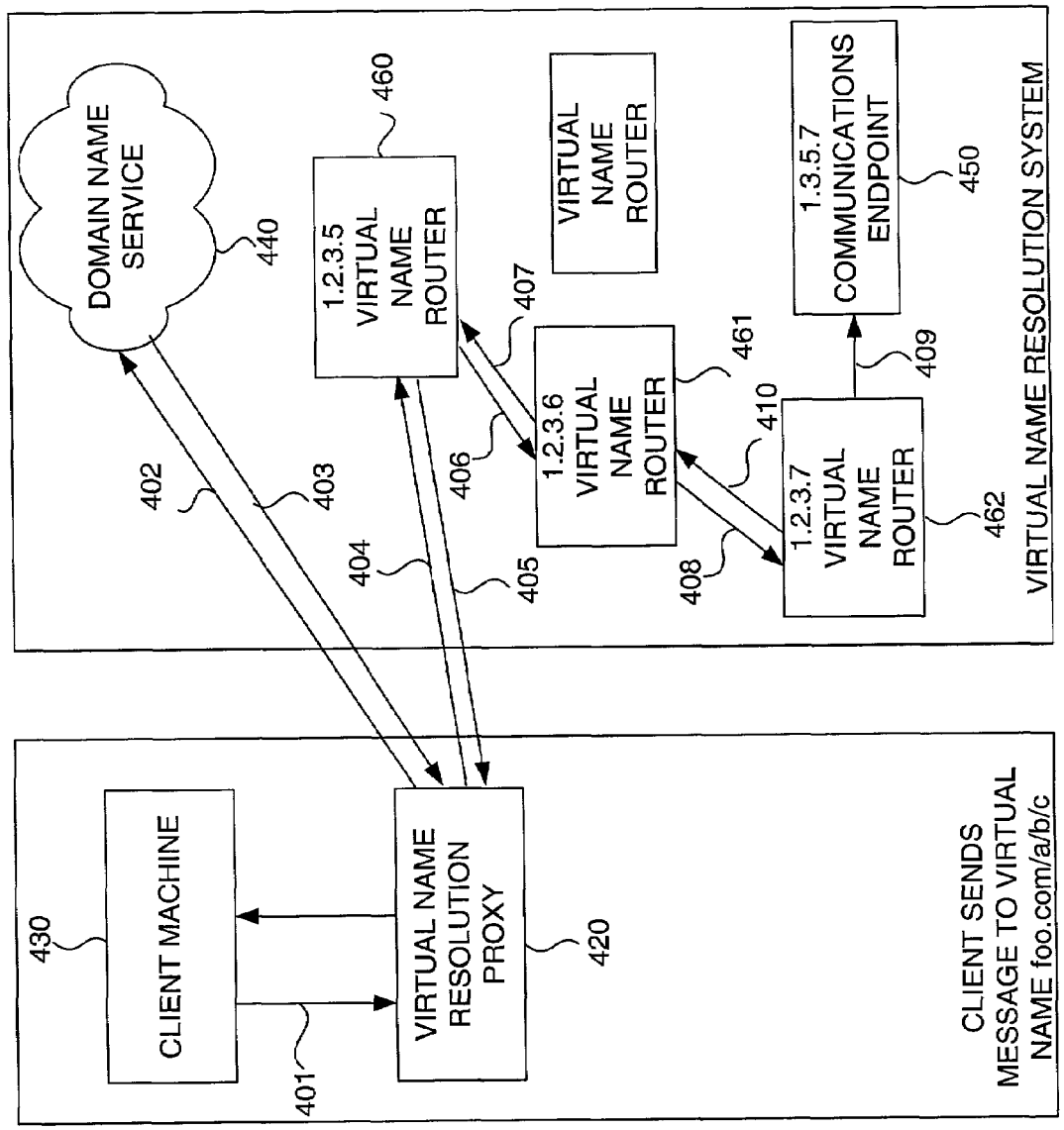
FIG. 4 shows how a network name, such as a URL, can be resolved by traversing a plurality of virtual name routers in additional to a conventional domain name server (DNS).

FIG. 4 shows in more detail how a message can be sent to a virtual endpoint according to the above principles. Suppose that a client needs to send a message to the communications endpoint named http://foo.com/a/b/c, indicated at element 450. The following describes steps that can be carried out to resolve this name according to one embodiment of the invention. To illustrate this resolution fully, it will be assumed that each component of this URL is routed using a different name router, although such will not necessarily be the case.

First, as indicated at step 401, the client sends the message to name resolution proxy 420, including the virtual name that must be resolved, in this case http://foo.com/a/b/c. Proxy 420 first sends a request 402 to conventional domain name server 440 to locate the IP address for the first component foo.com, which is returned at step 403. As in the conventional DNS scheme, this IP address (e.g., 1.2.3.5), is cached by the client so that the client can more rapidly resolve URLs starting with http://foo.com. However, the IP address returned by the DNS server is actually the IP address for the virtual name server (element 460) responsible for resolving names beginning with foo.com, rather than a final destination.

Next, in step 404, proxy 420 sends the message, addressed to http://foo.com/a/b/c, to the name router at 1.2.3.5 (element 460) and requests acceleration information.

Third, recalling the assumption that each component of the virtual name can be resolved and routed by a different name router, the name router at address 1.2.3.5 (element 460) looks up the /a component in its routing table and sees that it must route the message to the name router at 1.2.3.6 (element 461). Name router 460 forwards the message to the name router at 1.2.3.6, and sends the client acceleration information that foo.com/a should be resolved to 1.2.3.6 back to element 460 (step 407), which returns this information to the client at step 405. The client caches this intermediate resolution for future use.

The name router at 1.2.3.6 (element 461) looks up the /b component and sees that it must route the message to name router 462 at IP address 1.2.3.7. Name router 461 forwards the message to name router 462 at 1.2.3.7, and returns acceleration information that foo.com/a/b should be resolved to 1.2.3.7. Additionally, partial name resolution information is sent back along the reverse path to the client as before, and each name router in the path can cache the partial resolution results.

Name router 462 at address 1.2.3.7 looks up the /c component and obtains the physical address for the endpoint 450 (e.g., 1.3.5.7). Name router 462 forwards the message to the communications endpoint 450 and returns to the client acceleration information that foo.com/a/b/c should be resolved to 1.3.5.7. Consequently, both the client and one or more intermediate nodes can cache partial resolution results for future use. Note again that this final routing or, indeed, any intermediate routing, could have resulted in the message being sent to more than one endpoint, depending on the contents of the resolution table and any applicable policy (see discussion below for more details on policy).

Although the virtual network name example described above uses an "http:" scheme, indicating the use of the HTTP network protocol, any of the intermediate communications endpoints could have used a different protocol to forward the message. For example, the physical address for the /b component could have been soap://1.3.5.7, indicating the use of the SOAP network protocol for final delivery of the message. This ability to switch protocols midstream and to access any communications endpoint accessible over any network protocol is a major advance in the art. In this regard, each name router may include one or more protocol converters, such that messages received using one protocol (e.g., HTTP) can be converted to another protocol during the routing process, all without action by the originating client.

The routing information and decision-making process can be implemented in hardware or software, allowing routing of messages to VNNs at wire speed.

Figure 5:
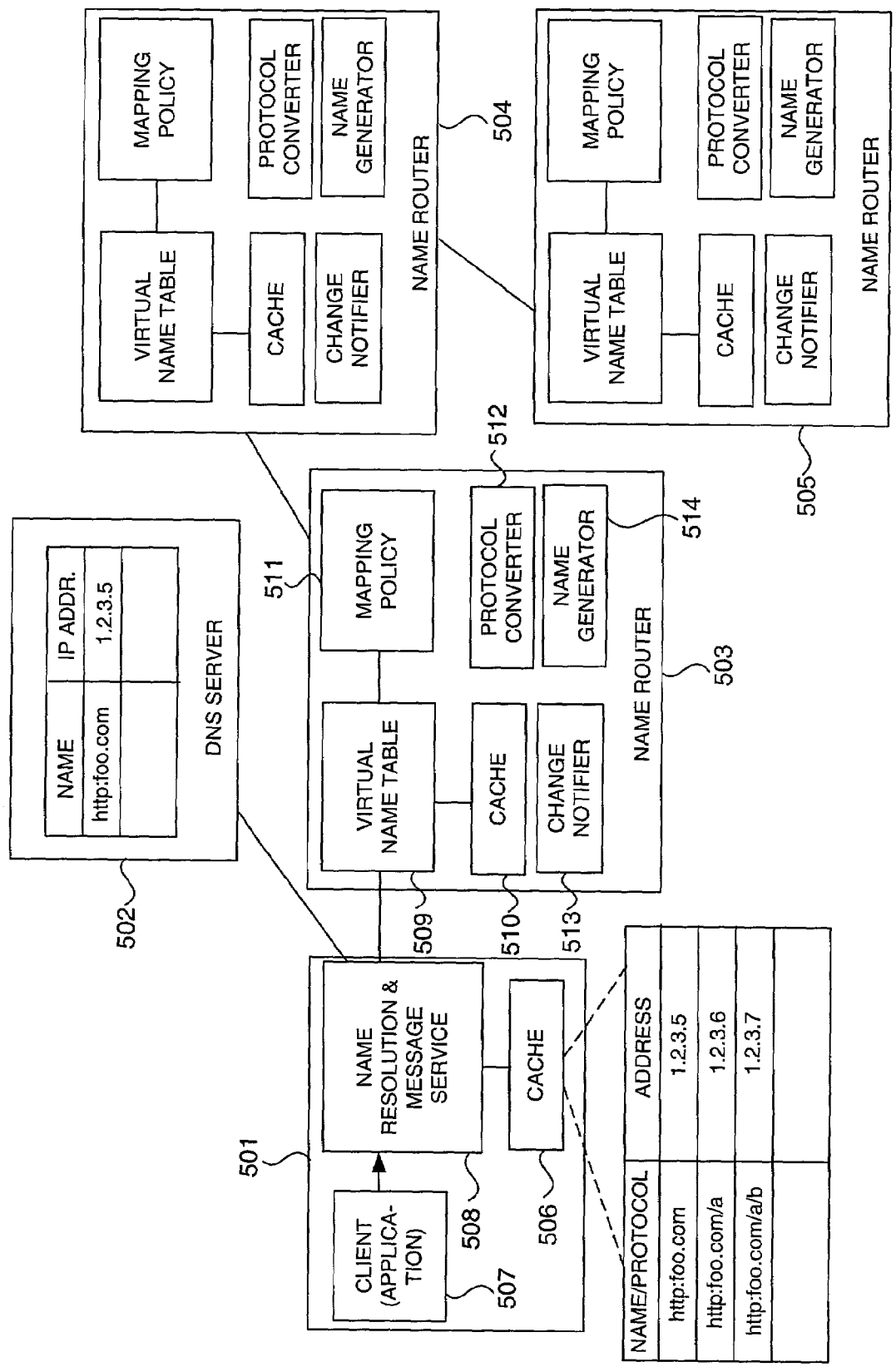
FIG. 5 shows in more detail how functions and data can be partitioned among one or more clients 501 and one or more name routers 503, 504, and 505.

FIG. 5 shows in more detail how functions and data can be partitioned among one or more clients 501 and one or more name routers 503, 504, and 505. Client computer 501 includes an application program 507 or other process that needs to send a message to a virtual endpoint. The application 507 uses a name resolution and message service 508 (using, for example, an application programming interface or API) to send the message to the virtual endpoint. As explained above, the virtual name may comprise an arbitrarily constructed name such as "Bob" or a URL-extended name, such as http://bob.com/a/b/c. In the embodiment shown in FIG. 5, name resolution and message service 508 includes the functions of proxy 420 in FIG. 4. A name resolution cache 506 includes partially resolved prefixes of each of a plurality of virtual names to which messages have been routed.

In one embodiment, each name router, such as name router 503, includes a virtual name table 509 (which may be stored in a database, such as a relational database), a cache 510 which stores resolved name prefixes, a mapping policy function 511 (discussed below), one or more protocol converters 512, a change notifier function 513, and a name generator function 514. Virtual name table 509 and cache 510 operate as explained above. Mapping policy 511 optionally applies a policy to each name resolution process, as described in more detail below. Protocol converter 512 converts protocols when forwarding messages if required. Change notifier function 513 transmits notices of changes to virtual name table mappings among name routers, as described in more detail below. This function may comprise an API, a user interface, and/or a message interface that permits remote changes to mappings. As explained in more detail below, changes to mappings can be made to move processing functions and to perform other operations.

In general, each name router receives a message directed to a virtual endpoint, resolves some or all of the name, forwards the message to the next name router corresponding to the partially resolved name, and (optionally) returns acceleration information to the originating client. Arbitrarily long and complex URL-extended names can be resolved piecemeal by a plurality of name routers, instead of a forced single-level name resolution scheme as conventionally implemented in DNS.

Applications of Policy to Message Routing and Acceleration

A second group of features involves the ability to apply policy at any step of the routing process. A policy may specify any routing behavior that involves some knowledge of the client sending to the VNN, or some knowledge of the contents of the message itself. Policy conditions include, but are not limited to, resolutions based on:

1. The identity of the client (e.g., a name, or a particular IP address);
2. The DNS domain of the client (e.g., ".com", ".org", or "foo.com");
3. The bandwidth to the client;
4. The trust domain of the client (e.g., a message originating from a machine inside of a data center bound for another machine in the data center);
5. The access level of the client (e.g., could be encoded in the message and could depend on whether the client is a paying customer, which could be routed to a fast server);
6. Message headers such as intended destination or requested action;
7. Message content such as signatures or message payload;

Messages can also be routed on any combination of conditions.

Routing can be made to different communications endpoints depending on the domain from which the message has been sent. For example, a client sending a message to http://foo.com/a/b/c from a computer inside the blip.com domain might get a resolution as above (where the endpoint is identified with the physical address 1.3.5.7), whereas a client resolving the same address from the from the baz.uk DNS domain might be routed as:

foo.com->1.2.3.5
/a->4.3.2.1
/b->4.3.2.3,
/c->7.5.3.1 where the 4.3.2.1, 4.3.2.3, and 7.5.3.1 addresses are in some sense closer to the baz.uk DNS domain than the 1.2.3.6 and 1.2.3.7, and 1.3.5.7 addresses. This feature permits, for example, mirrored servers to be located in different geographic locations, and clients requesting services from a particular endpoint will get routed to different physical machines depending on the client's originating address (e.g., IP address or domain).

Note that these policies can also include a refusal to resolve a given component at all, allowing administrators (for example) to provide VNNs that are only reachable from within a given organization. Acceleration data can be selectively returned on the basis of any of the above criteria, or based on other criteria. When the policy is applied in this way, the vulnerability of given resources to various forms of hacking can be greatly reduced, as there may be an unknowable number of name routers between the domain name and the protected resource. The examples of policy application above show that a hacker cannot even guess where the resource might be, as the only necessarily public portion of the routing is the resolution of the domain name to the virtual name server associated with that domain name.

Figure 6:
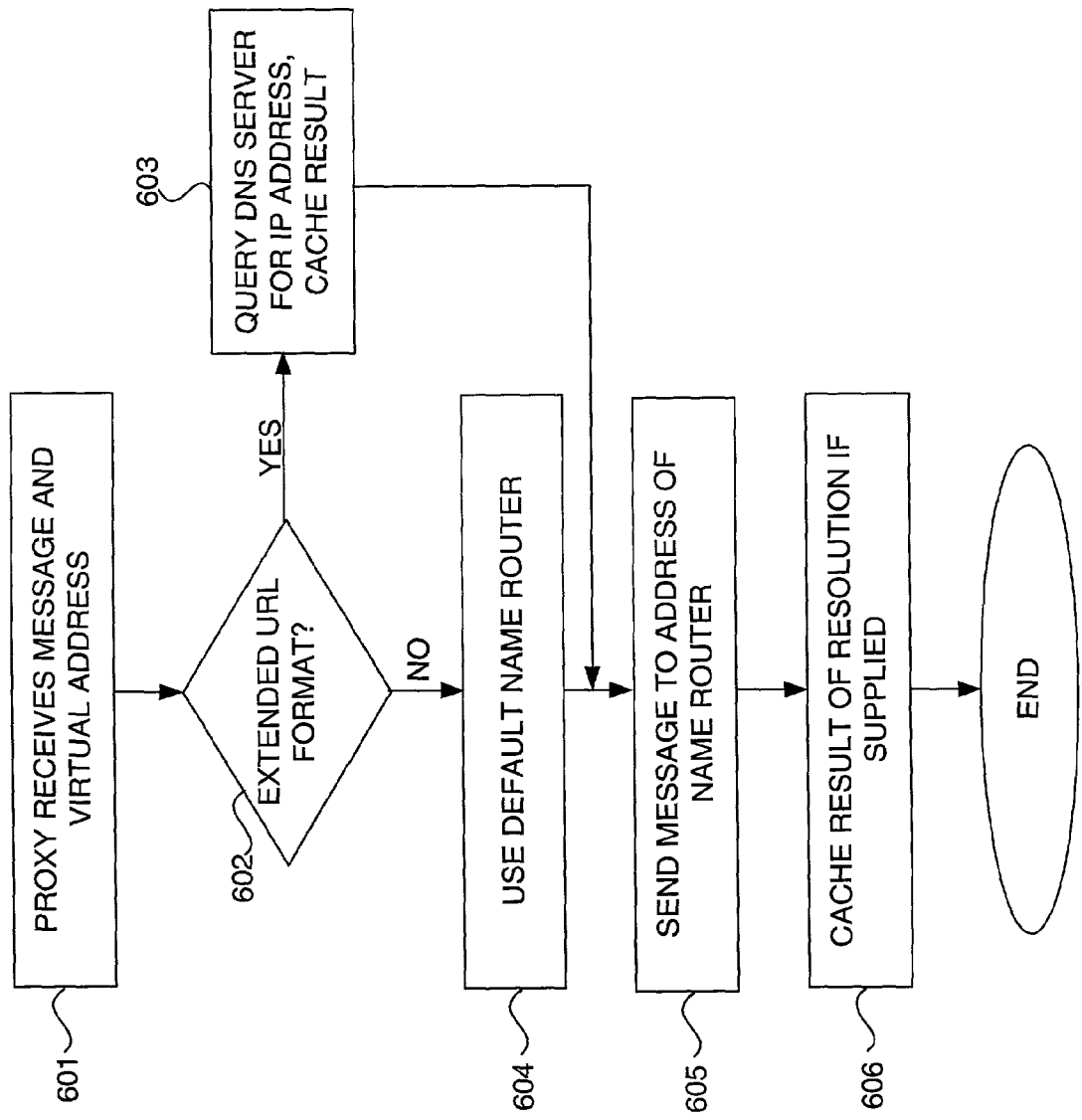
FIG. 6 shows steps that can be carried out by a proxy or message service to route messages to a virtual endpoint.

FIG. 6 shows a method including steps that can be carried out by a proxy, such as virtual name resolution proxy 308 of FIG. 3. In step 601, the proxy receives a message and virtual network address. In step 602, a determination is made as to whether the address is an extended URL address, in which case step 603 is executed and a conventional DNS query is conducted to obtain an IP address for the first-level name router. If not, then in step 604 a default name router is used (e.g., a default IP address or a default table that maps a default name router to a known IP address).

In step 605, the message is sent to the address of the name router obtained in either step 604 or step 603. In step 606, the result of any name resolution provided by downstream name routers is cached. Although not explicitly shown in FIG. 6, this cache can be consulted to resolve all or part of a virtual network name rather than sending the message to the name router (e.g., so-called "acceleration data"), as illustrated by cache 506 in FIG. 5.

Figure 7:
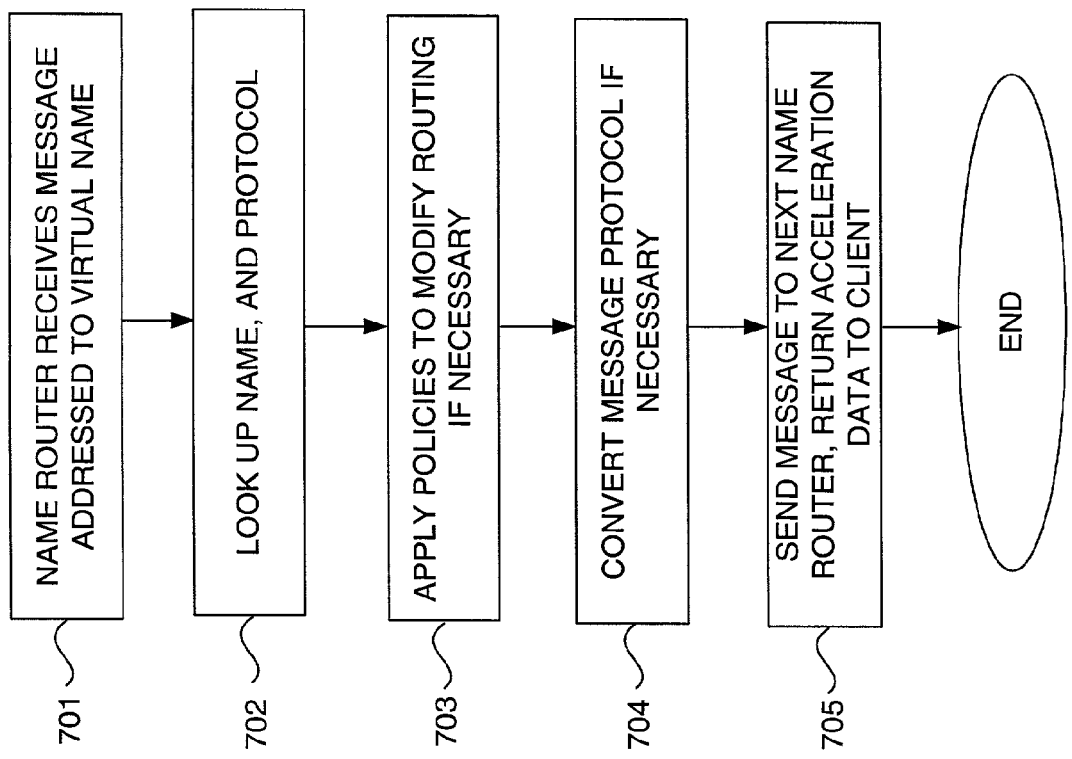
FIG. 7 shows steps that can be carried out by one or more name routers to resolve a virtual network name and route a message to a communication endpoint corresponding to the virtual network name.

FIG. 7 shows a method including steps that can be carried out by a name router, such as name routers 503, 504, and 505 in FIG. 5. In step 701, the message is received at the name router along with the network name to which it is to be transmitted. In step 702, the local virtual name table is consulted to look up a portion of the name (and, optionally, the protocol) as described above with reference to FIG. 4.

In step 703, any policies are applied to modify the routing decisions if necessary, using the principles outlined above. This may include, for example, routing the message to a different location based on the identity of the client. In step 704, protocol conversions are performed if necessary. Finally, in step 705 the message is sent to the name router corresponding to the partially resolved address, and acceleration data is returned to the client if applicable.

Notifications on Namespace Administration Actions

In one embodiment, the system also includes the ability to generate and disseminate notifications on changes to VNNs. Each administrative function on a name router (adding a new name component, deleting an old name component, changing an existing name component) can generate a notification that can be disseminated to other name routers.

For example, suppose that an online magazine makes all its content freely available 6 months after publication, but requires a subscription for content newer than 6 months. This online magazine can take advantage of this inventive principle by holding all the current content under www.onlinemagazine.com/subscription, and all the free content under www.onlinemagazine.com/free. As a given month's content becomes free (say www.onlinemagazine.com/subscription/may2001), the magazine renames www.onlinemagazine.com/subscription/may2001 to www.onlinemagazine.com/free/may2001. A client subscribing to changes to www.onlinemagazine.com/free will then be informed that the May 2001 content is now available.

Automatic Name Generation and Delegation

Various features of this aspect of the invention include:

1. The ability of a name router to generate temporary VNNs and map them to physical addresses 2. The ability of a name router to generate a VNN based on some key 3. The ability of a name router to provide a default route for a VNN.

Name routers can automatically generate unique VNN components when demanded. Such unique components may make use of random number generators; time of day parameters; hashed values; or the like.

For example, suppose that an administrator is exposing a new communications endpoint reachable through a VNN in the www.foo.com/a namespace. The administrator can request a unique and unused name from the name router serving the www.foo.com/a VNN; the administrator makes a request to the server and the server returns www.foo.com/a/uniquename12345. The administrator then informs the name router of the physical address to which the new name maps.

Name routers can also generate unique VNN components based on a key. For example, suppose that an administrator wants to provide a VNN component based on a unique ID assigned to a user, so that the name router can provide a security policy based on the user's ID to a given name. The administrator therefore requests a unique name based on the user's ID, and then informs the name router of the physical address to which the new name maps. When messages are sent to that new name, the name router can use the sender's ID to determine whether that sender has access to the new name.

Name routers can also provide a default route for a VNN. For example, suppose that an administrator wants www.foo.com/a/specialname to be routed to physical address 2.3.4.5 for special handling, but wants all other components under /a to be routed to physical address 2.4.6.8 for regular handling. The administrator sets a default route for /a/* to 2.4.6.8, and sets a specific route for /a/specialname to 2.3.4.5. Thus, no matter what names are created under /a, they will be routed to 2.4.6.8.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein, and any of the functions depicted in the figures, can be implemented in computer software and stored on computer-readable medium for execution in a general-purpose or specialpurpose computer. All of the functions and method steps can be implemented on one or more computers that include a processor, memory, network connections, and appropriate input/output devices. It will be appreciated that the various delimeters (e.g., "/" and ":") used herein are exemplary only, and references to such delimeters in the claims are not intended to be limited to the specific syntax illustrated.

We claim:

1. A method of routing a message to a communication endpoint identified by a name comprising a plurality of discrete components, the method comprising the steps of:
   (1) receiving the message identified by a name comprising a plurality of discrete components at a first name router;
   (2) in the first name router, resolving a first portion of the name into a first address;
   (3) transmitting the message from the first name router to the first address resolved in step (2);
   (4) receiving the message at a second name router corresponding to the address resolved in step (2);
   (5) at the second name router, resolving a second portion of the name into a second address; and
   (6) transmitting the message to a computer corresponding to the second address;
   (7) transmitting the first address from the first name router to an originator of the message; and
   (8) transmitting the second address from the second name router to the originator of the message.

2. The method of claim 1, wherein step (2) is performed on the basis of a resolution policy that allows the same name to be resolved to a different address under different circumstances.

3. The method of claim 2, wherein step (2) comprises the step of resolving the name to a first address if the message originates from a first originator, and resolving the name to a second address if the message originates from a second originator.

4. The method of claim 2, wherein step (2) comprises the step of resolving the name on the basis of a policy that resolves a given name differently depending on a domain of an originator of the message.

5. The method of claim 2, wherein step (2) comprises the step of resolving the name on the basis of a policy that resolves a given name differently depending on a header portion of the message excluding the name.

6. The method of claim 2, wherein step (2) comprises the step of resolving the name on the basis of a policy that resolves a given name differently depending on a content portion of the message excluding the name.

7. The method of claim 1, further comprising the step of, prior to step (3), converting the message from a first protocol to a second protocol on the basis of information contained in a portion of the name.

8. A method of resolving a name of a communication endpoint, wherein the name comprises a plurality of discrete name components, the method comprising the steps of:
   (1) transmitting the name having a plurality of discrete name components to a first name server;
   (2) receiving from the first name server a first address corresponding to resolution of a first component of the name;
   (3) transmitting the name to a second name server at the first address in order to resolve at least one other of the components of the name into a second address;
   (4) receiving the second address from the second name server; and
   (5) storing the second address in a cache.

9. The method of claim 8, wherein step (3) comprises the step of transmitting the name to the second name server with a message intended for delivery to the communication endpoint.

10. The method of claim 8, wherein step (2) comprises the step of receiving an Internet Protocol (IP) address as the first address, and wherein step (3) comprises the step of transmitting to a name server having the IP address.

11. The method of claim 8, wherein step (3) comprises the step of transmitting a name having a first component identifying a protocol scheme; a second component identifying a host server; and a third component identifying a resource.

12. The method of claim 8, further comprising the step of, prior to step (1), checking to determine whether the name is stored in a local cache and, if so, transmitting a message to the communication endpoint without performing steps (2) and (3).

13. The method of claim 8, further comprising the step of storing in a local cache a plurality of partial name resolution results for the same name from a plurality of different name servers.

14. The method of claim 8, further comprising the step of requesting acceleration information representing partially resolved name results from the second name server.

15. A computer-readable medium comprising computer-executable instructions that, when executed by a computer, resolve a name of a communication endpoint, wherein the name comprises a plurality of discrete name components, the instructions performing the steps of:
   (1) transmitting the name having a plurality of discrete name components to a first name server;
   (2) receiving from the first name server a first address corresponding to resolution of a first component of the name;
   (3) transmitting the name to a second name server at the first address in order to resolve at least one other of the components of the name into a second address;
   (4) receiving the second address from the second name server; and
   (5) storing the second address in a cache.

16. The computer-readable medium of claim 15, wherein the computer-executable instructions further perform the step of transmitting the name to the second name server with a message intended for delivery to the communication endpoint.

17. The computer-readable medium of claim 15, wherein the computer-executable instructions further perform the step of receiving an Internet Protocol (IP) address as the first address, and wherein step (3) comprises the step of transmitting to a name server having the IP address.

18. A method of resolving names in a computer network, comprising the steps of:
   (1) transmitting to a first virtual name router a message intended for delivery to a communication endpoint identified by a name;
   (2) the first virtual name router resolving the name into a first address;
   (3) transmitting the message to a second virtual name router corresponding to the first address;
   (4) the second virtual name router resolving the name into a second address;
   (5) transmitting the message to the communication endpoint corresponding to the second address;
   (6) transmitting the first address from the first virtual name router to an originator of the message; and
   (7) transmitting the second address from the second virtual name router to the originator of the message.

19. The method of claim 18, wherein step (2) comprises the step of resolving the name on the basis of a policy that resolves a given name differently depending on a resolution policy stored in the first virtual name router.

20. The method of claim 18, further comprising the step of forwarding the message to a plurality of addresses depending on a resolution policy stored in the first virtual name router.

21. The method of claim 18, further comprising the step of converting a protocol format of the message in the second virtual name router.

22. The method of claim 18, further comprising the step of transmitting a notification from the second virtual name router to the first virtual name router of a name change.

23. The method of claim 18, further comprising the step of, in the first virtual name router, generating and returning upon request a unique name component incorporating at least a part of the name.

24. The method of claim 18, wherein step (4) comprises the step of providing a default routing for the name.

25. A method of resolving a name of a communication endpoint. wherein the name comprises a plurality of discrete name components, the method comprising the steps of:
   (1) transmitting the name having a plurality of discrete name components to a first name server;
   (2) receiving from the first name server a first address corresponding to resolution of a first component of the name; and
   (3) transmitting the name to a second name server at the first address in order to resolve at least one other of the components of the name into a second address
   (4) receiving the second address from the second name server; and
   (5) transmitting the message to the second address for delivery to the communication endpoint.

26. A computer-readable medium comprising computer-executable instructions that, when executed by a computer, resolve a name of a communication endpoint, wherein the name comprises a plurality of discrete name components, the instructions performing the steps of:
   (1) transmitting the name having a plurality of discrete name components to a first name server;

(2) receiving from the first name server a first address corresponding to resolution of a first component of the name; and
(3) transmitting the name to a second name server at the first address in order to resolve at least one other of the components of the name into a second address
(4) receiving the second address from the second name server; and
(5) transmitting the message to the second address for delivery to the communication endpoint.

* * * * *